US012797866B2

(12) United States Patent
Grossmann et al.

(10) Patent No.: US 12,797,866 B2
(45) Date of Patent: Nov. 17, 2026

(54) CATIONIC COLLECTORS FOR IMPROVING A PROCESS FOR FROTH FLOTATION OF SILICATES

(71) Applicant: Clariant International, Ltd., Muttenz (CH)

(72) Inventors: Adriana Grossmann, Mühldorf (DE); Tobias Platen, Hochheim am Main (DE); Klaus Raab, Burgkirchen (DE); Claudio Wagner Da Silva, São Paulo (BR); Leandro Seixas Bicalho, Belo Horizonte (BR); Pedro Martins de Almeida Rollo, Dubai (AE)

(73) Assignee: Clariant International, Ltd., Muttenz (CH)

( * ) Notice: Subject to any disclaimer, the term of this patent is extended or adjusted under 35 U.S.C. 154(b) by 552 days.

(21) Appl. No.: 17/704,116

(22) Filed: Mar. 25, 2022

(65) Prior Publication Data

US 2023/0302464 A1 Sep. 28, 2023

(51) Int. Cl.
*B03D 1/02* (2006.01)
*B03D 1/01* (2006.01)

(52) U.S. Cl.
CPC ............... *B03D 1/021* (2013.01); *B03D 1/01* (2013.01); *B03D 2201/02* (2013.01); *B03D 2203/06* (2013.01)

(58) Field of Classification Search
CPC .................................. B03D 1/021; B03D 1/02
See application file for complete search history.

(56) References Cited

U.S. PATENT DOCUMENTS

| | | | | |
|---|---|---|---|---|
| 3,363,758 A | | 1/1968 | Cronberg | |
| 3,768,646 A | * | 10/1973 | Grannen | B03D 1/01 209/166 |
| 4,319,987 A | | 3/1982 | Shaw | |
| 4,425,229 A | | 1/1984 | Baron | |
| 4,797,202 A | | 1/1989 | Klimpel | |
| 5,261,539 A | | 11/1993 | Hancock | |
| 5,540,336 A | | 7/1996 | Schreck | |
| 5,720,873 A | | 2/1998 | Klingberg | |
| 6,076,682 A | | 6/2000 | Gustafsson | |
| 2009/0152174 A1 | | 6/2009 | Pedian | |
| 2014/0048455 A1 | * | 2/2014 | Bittner | B03D 1/01 564/493 |
| 2014/0110621 A1 | * | 4/2014 | Kerns | B03D 1/016 252/61 |
| 2014/0144290 A1 | | 5/2014 | Martins | |
| 2018/0036743 A1 | * | 2/2018 | Wilson | B03D 1/01 |

FOREIGN PATENT DOCUMENTS

| | | | | |
|---|---|---|---|---|
| CA | 1100239 | | 4/1981 | |
| EP | 174866 A | * | 3/1986 | B03D 1/008 |
| EP | 0174866 A2 | * | 3/1986 | B03D 1/014 |
| WO | 2008077849 | | 7/2008 | |
| WO | 2012139985 | | 10/2012 | |
| WO | 2020221685 | | 11/2020 | |
| WO | WO-2020221685 A1 | * | 11/2020 | C07C 215/18 |

OTHER PUBLICATIONS

L.O. Filippov et al, "The use of collectors mixture in the reverse cationic flotation of magnetite ore: The role of Fe-bearing silicates", Minerals Engineering., GB, (Jan. 1, 2010), vol. 23, No. 2, doi:10.1016/j.mineng.2009.10.007, ISSN 0892-6875, pp. 91-98, XP055525499.

Liu et al., "Collaborative Adsorption and Flotation of N-dodecyl Ethylenediamine with Short Chain Alcohol on Quartz", (Int. J. Electrochem. Sci., 10 (2015) 10188-10198).

* cited by examiner

*Primary Examiner* — Ryan B Huang
*Assistant Examiner* — Adam Adrien Germain

(57) ABSTRACT

A process or use of at least one hydroxyl ether diamine for improving a process for froth flotation of silicates. Compared to the benchmark ether monoamines, ether diamines or mixtures thereof, the selectivity performance of the hydroxyl ether diamines is significantly better, delivering higher recoveries for the mineral of interest.

20 Claims, No Drawings

CATIONIC COLLECTORS FOR IMPROVING A PROCESS FOR FROTH FLOTATION OF SILICATES

TECHNICAL FIELD

The present invention relates to the use of hydroxyl ether diamines for improving a process for froth flotation of silicates. Compared to the benchmark ether monoamines, ether diamines or mixtures thereof, the selectivity performance of the hydroxyl ether diamines is significantly better, delivering higher recoveries for the mineral of interest.

BACKGROUND

Silicates are usually found as gangue minerals for different types of ores, like iron, phosphate, niobium, lithium ore, and others. A non-exhaustive list of major silicate groups contains nesosilicates, sorosilicates, cyclosilicates, inosilicates, phyllosilicates, tectosilicates, et al. The separation of the silicate minerals from these types of ores can be effected by direct flotation of the silicates. The chemicals used for flotation suffer often from unsatisfactory selectivity which does not allow the production of saleable concentrations. To increase the selectivity, relatively large quantities of regulating reagents have to be used, especially collecting agents that are responsible to float the silicates selectively from the other minerals.

Removal of silicates from different ores by froth flotation in the presence of hydrophobic amines is a well-known process. The negatively charged silicates can be hydrophobized using suitable amphiphilic amines which attach to the silicate surface. Injection of air in a flotation cell containing an aqueous suspension of the treated ore leads to formation of gas bubbles. These hydrophobic gas bubbles collect the hydrophobized silicate particles and transport them to the top of the flotation cell. At the top of the flotation cell the froth with the silicate particles is collected. Finally, the froth will be removed from the surface and the enriched mineral is left at the bottom of the flotation cell.

In the case of an iron ore, it often contains considerable amounts of silicates, predominantly quartz (hereinafter also represented as $SiO_2$), which may be in the range of from about 20 to 45 wt.-%. However, the presence of higher contents of silicates has a detrimental effect on the quality of the iron ore, for example in reduction processing in a blast furnace. Therefore, the $SiO_2$ content in iron ore concentrates is the limiting factor for their usability; typically it should not exceed 3% for steelmaking processes from iron ore pellets, in direct reduction processes (DRI-pellets) as well as in electric-arc smelting processes.

Moreover, with the development of the iron electrolysis process for ultra-low carbon dioxide steelmaking (EU ULCOS project), more stringent quality requirements are applied to iron ore concentrates in terms of very low $SiO_2$ and $Al_2O_3$ content (more than 98 wt.-% Fe oxide is required).

In order to become commercially usable, it is therefore essential that the silicates content of a crude iron ore is considerably reduced. However, due to the shrinking reserves of high-grade ores in the world the quality of ore is constantly decreasing. With raised $SiO_2$ content in the ores a selective enrichment of iron respectively a selective removal of silicates is more difficult than in the past with ores of higher quality. Nowadays froth flotation is considered to be the most efficient process in mineral processing to recover valuable minerals from gangue.

A common process of removing silicates from iron ore is reverse froth flotation, where the silicates are enriched in the froth (tailings) and leave the system with the froth, and the iron ends up in the bottom fraction (concentrate). In practice reverse froth flotation usually encounters one of two drawbacks: either the iron ore bottom fraction contains a low level of $SiO_2$—which in turn leads to a low recovery of iron; or the recovery of iron is high—which in turn leaves a higher level of $SiO_2$ in the ore.

Various solutions have been proposed in the prior art to simultaneously increase iron recovery and reduce $SiO_2$ levels.

In the cationic route for reverse iron ore flotation the gangue mineral, mainly quartz, is floated with alkyl ether monoamines, alkyl ether diamines, and mixtures thereof often partially neutralized with acetic acid, as a collector. The degree of neutralization is an important parameter as higher neutralization degrees enhance the collector solubility but impair the flotation performance. Often the iron ore is simultaneously depressed by non-modified starches.

U.S. Pat. No. 3,363,758 relates to a froth flotation process for separating silica from an ore employing acid salts of primary aliphatic ether amines and aliphatic ether diamines in which the aliphatic radical has between one and 13 carbon atoms.

CA 1100239 discloses aqueous emulsions of alkyl ether amines and alkyl ether diamines as collecting agents for use in a froth flotation process for separating or concentrating minerals from ore.

U.S. Pat. No. 4,319,987 describes the use of primary branched aliphatic alkyl ether monoamines and their partial acid salts for removal of silicate from iron ore. The methyl-branched alkyl residues predominantly contain 8-10 carbon atoms.

U.S. Pat. No. 4,797,202 describes the use of a collection of hydroxyl ether diamine collectors for sulfide minerals or metal containing oxide minerals, but not for reverse iron ore flotation with silicates as gangue minerals.

U.S. Pat. No. 6,076,682 discloses the combined use of an alkyl ether monoamine with an alkyl ether diamine for the silicate flotation from iron ore. In preferred alkyl ether monoamines the alkyl residue contains 8 to 12 carbon atoms and in preferred alkyl ether diamines the alkyl residue contains 8 to 14 carbon atoms.

WO 2012/139985 discloses a process for enriching an iron mineral from a silicate containing iron ore by inverse flotation using a collector comprising an ether amine and/or an ether diamine with an aliphatic iso-$C_{13}$H27-group with average branching degree ranging from 1.5 to 3.5.

Meanwhile various studies have indicated that the addition of non-ionic surfactants as for example fatty alcohols can improve the cationic flotation of silicates because it increases flotation selectivity and recovery of silicates compared with the individual components, as well as a remarkable decrease in cationic collector consumption.

Filippov, et. al (Minerals Engineering 23 (2010) 91-98) disclose that the addition of fatty alcohol (e.g. tridecanol) may increase the flotation recovery of quartz. Similarly, also the flotation of iron containing silicates as for example pargasite is supported, even in the presence of starch.

Liu (Int. J. Electrochem. Sci., 10 (2015) 10188-10198) discloses that flotation recovery of pure quartz in froth flotation using N-dodecyl ethylene diamine as cationic collector is improved in the presence of alcohols, including ethanediol and glycerol. However, longer chain mono alcohols show the most promising results. They allow to substitute part of the diamine.

US 2014/0144290 teaches collector compositions and methods for making and using same. The collector can include one or more etheramines and one or more amidoamines. A liquid suspension or slurry comprising one or more particulates can be contacted with the collector to produce a treated mixture. A product can be recovered from the treated mixture that includes a purified liquid having a reduced concentration of the particulates relative to the treated mixture, a purified particulate product having a reduced concentration of liquid relative to the treated mixture, or both. The collector may comprise a polyol as freezing point depressant.

U.S. Pat. No. 5,540,336 teaches the flotation of iron ores using mixtures containing at least one ether amine of formula (I):

$$R^1O—(C_nH_{2n})_y—NH—(C_mH_{2m}—NH)_xH$$

in which $R^1$ is a linear or branched chain aliphatic hydrocarbon moiety having 6 to 22 carbon atoms and 0, 1, 2 or 3 double bonds;

n and m independently of one another represent the number 1, 2 or 3;

x is 0 or the number 1, 2 or 3; and y is 2 or 3, and at least one other anionic and/or nonionic co-collector which is an anionic or nonionic surfactant.

U.S. Pat. No. 4,319,987 teaches the use of primary aliphatic ether amines as silica collectors in the concentration of minerals by the froth flotation process. More specifically, the use of mixtures of primary methyl branched aliphatic ether amines and the partially-neutralized salts thereof as flotation reagents. In further aspect, the use of mixtures of 3-isooctoxypropyl monoamine and 3-isodecoxypropyl monoamine and/or the partially-neutralized acetate salts thereof as collectors for silica in the beneficiation of oxidized taconite ores.

U.S. Pat. No. 5,261,539 describes the use of alkoxylated alkyl guanidines and alkoxylated amines for the reverse flotation of calcite.

US 2009/0152174 describes the use alkyltriamines in the beneficiation by flotation of minerals containing silicates.

U.S. Pat. No. 5,720,873 describes the combination of quaternary ammonium salts with fatty oxy-alkylene compounds for purifying calcium carbonate. This combination achieves an improvement compared with quaternary ammonium salts with respect to separating off acid-insoluble components.

U.S. Pat. No. 4,425,229 describes a process to concentrate a phosphate ore using cationic collectors selected from the group of primary amine and primary amine salt as flotation agents for the silicate gangue minerals.

However, there are different aspects which limit the efficiency of the known flotation processes. The collectors which are described in the prior art for silicates flotation exhibit inadequate selectivity, leading to low recoveries of the mineral of interest in the final concentrate. The objective of the present invention was therefore to provide an improved collector for silicates flotation.

In the case of an iron ore, particles have very small particle sizes which are floated with the froth; the currently known collectors are not selective enough and float certain modifications of iron ore as for example hematite at least partly with the froth; mixed particles with high iron but low quartz content are removed with the froth. This lack of selectivity also happens to other types of ores where other minerals besides the silicates are floated together to the froth, decreasing the recovery of the mineral of interest.

SUMMARY

As the recovery rate is of major economic importance to the plant operation there was the need for a flotation aid and a process for the silicate flotation which allows for an improved recovery rate of the valuable minerals in the concentrate, raising the silicates content to the froth.

Surprisingly it has been found that the use of a collector composition comprising a hydroxyl ether diamine gives rise to an improved enrichment of an iron ore and phosphate ore from a silicate-containing bearing mineral by carrying out a direct flotation of silicates.

The collecting performance of the hydroxyl ether diamine is significantly better, compared to the benchmark of ether monoamines, ether diamines and mixtures thereof. A flotation process which makes use of a hydroxyl ether diamine as part of a collector is considered to be a cationic flotation process. Concurrently the silicates content of the recovered iron ore concentrate and phosphate ore concentrate at least remains essentially unchanged on its low level but is often further reduced.

DETAILED DESCRIPTION

In a first aspect of the invention there is provided the use of a hydroxyl ether diamine for improving the collector performance of a collector composition for the reverse iron ore flotation and reverse phosphate ore flotation comprising at least one compound according to

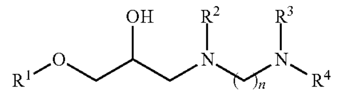

wherein $R^1$ is a linear or branched alkyl or alkenyl group having $C_6$-$C_{24}$ carbon atoms and $R^2$, $R^3$, $R^4$ are H or a linear or branched alkyl or alkenyl group having $C_1$-$C_5$ carbon atoms and n is an integer 2-5 or a salt of the at least one compound of Formula (1) formed by neutralization with formic, acetic, propionic or hydrochloric acid.

$R^2$, $R^3$ and $R^4$ can be different or the same independently from each other.

The alcohol used for the preparation of the hydroxyl ether diamine may be any linear fatty alcohol or branched alcohol with between 6 and 24 carbon atoms. Preferably the alcohol has 7 to 18 and more preferably 8 to 15 carbon atoms, as for example 6 to 18 carbon atoms, or 6 to 15 carbon atoms, or 7 to 24 carbon atoms, or 7 to 15 carbon atoms, or 8 to 24 carbon atoms, or 8 to 18 carbon atoms. In a preferred embodiment the alcohol is a primary alcohol. In a preferred embodiment the alkyl chain is branched due to its reduced tendency for crystallization. The alkyl chain may be saturated or unsaturated. Preferably the alkyl chain is saturated or at least partially saturated.

Examples for preferred linear fatty alcohol is octanol, nonanol, decanol, undecanol, dodecanol, tridecanol, tetradecanol, hexadecanol, octadecanol and their mixtures. They may be of natural or synthetic origin. Especially preferred are alcohol mixtures based on natural fats and oils as for example coco fatty alcohol, palm fatty alcohol, palm kernel fatty alcohol, soy fatty alcohol, rapeseed fatty alcohol and tallow fatty alcohol.

Particular preference as alcohol is given to branched alcohols such as 2-ethylhexanol and to the different isomers of isononanol, the different isomers of isodecanol and the different isomers of isotridecanol. Especially preferred are mixtures of different isomers of isononanol, the different isomers of isodecanol and/or the different isomers of isotridecanol.

Examples for especially preferred hydroxyl ether diamines are 1-(2-aminoethylamino)-3-(octyloxy)propan-2-ol, 1-(2-aminoethylamino)-3-(octyloxy-/decyloxy)propan-2-ol, 1-(2-aminoethylamino)-3-(isononyloxy)propan-2-ol, 1-(2-aminoethylamino)-3-(decyloxy)propan-2-ol, 1-(2-aminoethylamino)-3-(isoundecyloxy)propan-2-ol, 1-(2-aminoethylamino)-3-(isotridecyloxy)propan-2-ol, 1-(2-aminoethylamino)-3-(dodecyloxy-/tetradecyloxy)propan-2-ol.

The hydroxyl ether diamine can be partially neutralized using organic or inorganic acids. Preferred acids are acetic acid and hydrochloric acid. The degree of neutralization is an important parameter as higher degrees of neutralization enhance the collector solubility. Higher collector solubility is necessary when the collector is prepared as a dispersion in water before dosing in the slurry.

Optionally the collector composition according to the invention may comprise additional components such as chain extenders, frothers, and/or depressants which may cause a further improvement in the flotation process and especially in the selectivity of the process.

Preferred chain extenders are substances of low polarity and accordingly low water solubility such as mineral or vegetable oils as for example kerosene, diesel, naphthenic oils, paraffinic oils, rapeseed oil, sunflower oil, soy oil or tallow fat. The presence of chain extenders has proven especially beneficial for the flotation of coarse mineral particles with particle size of for example 150 μm or even more.

Preferred depressants are hydrophilic polymers which raise the selectivity of the flotation process by interaction with the iron ore, rendering the surface of the iron ore more hydrophilic. Examples for preferred depressants are natural and modified starches as for example corn starch, cassava starch, potato starch, wheat starch, rice starch, arrowroot starch.

Often the addition of a frother has proven advantageous in order to create and/or modulate the froth behavior. Preferred frothers are pine oil, eucalyptus oil, cresylic acid, 2-ethylhexan-1-ol and 4-methyl-2-pentanol.

Alternatively or in addition to being part of the collector composition said further additives may be added to the pulp separately, for example in the flotation cell. The collector composition may also contain a solvent. Preferred solvents are water and linear or branched monohydric alcohols with 1 to 14 carbon atoms as for example methanol, ethanol, propanol, butanol, pentanol, hexanol, heptanol, octanol, 2-ethylhexanol, nonanol, decanol, undecanol, dodecanol, tridecanol and tetradecanol. Especially preferred are water and mixtures of water with methanol, ethanol and/or propanol. Preferably the mass ratio between collector composition and the solvent is in the range of from 1:19 to 19:1 and more preferably in the range of from 1:9 and 9:1 and especially in the range of from 1:4 and 4:1 as for example in the range of from 1:19 to 1:9; or in the range of from 1:19 to 1:4; or in the range of from 1:9 to 1:19; or in the range of from 1:9 to 4:1; or in the range of from 1:4 to 1:19; or in the range of from 1:4 to 1:9.

The collector composition can be prepared by simply mixing the components in the given ratio. The sequence of addition of the components to the mixing appliance is not critical.

In a first preferred embodiment, the mixing is made batch wise, e.g. in a kettle, vessel or tank, preferably with stirring.

In a second preferred embodiment the mixing is made in a continuous mode e.g. by metered dosing of the components into a mixing pipe optionally equipped with a static mixer or a dynamic mixer. Static mixers are devices located in a tubing having stationary internals which effect mixing of fluid product streams using flow energy. Useful static mixers have proven to be, for example, Multiflux, Sulzer, PMR, McHugh, Komax and Honeycomb, X, Ross-ISG and helical mixers. Preferred dynamic mixers are rotor-stator dispersers which are also called high-shear mixers. Useful dynamic mixers have proven to be toothed disk dispersers (e.g. Ultra-Turrax®) and high-pressure homogenizers (Microfluidizer®). Suitable shear rates are also achievable by means of a Cavitron or by ultrasound.

In the process for enriching an iron ore or phosphate ore according to the second aspect of the invention, gangue predominantly comprising silicates is separated from a crude iron ore and phosphate ore by direct cationic flotation of the silicates to produce an iron ore concentrate and a phosphate ore concentrate.

This process comprises the steps of bringing an aqueous pulp of the finely ground crude iron ore or phosphate ore into contact with the collector composition according to the first aspect of the invention comprising a hydroxyl ether diamine, foaming of the so obtained composition, separation of the silicate containing froth and recovery of the enriched iron ore or phosphate ore. After completion of the flotation a silicate-enriched froth (tailings) and a bottom fraction enriched in iron or phosphate and poor in silicate are obtained (concentrate).

Prior to the flotation process the iron ore or the phosphate ore usually have to be ground, preferably together with water, to the desired particle size. In a preferred embodiment the particle size is between 5 and 200 μm, more preferably between 10 and 150 μm as for example between 5 and 150 μm or between 10 and 200 μm.

The collecting composition according to the claimed embodiments of the invention has proven to be especially beneficial for cationic flotation of silicates in an iron or phosphate ore, having a P80 less or equal to 150 μm, suitably less or equal to 100 μm, for example less or equal to 50 μm. As a suspension in water the ground iron ore and phosphate ore may be deslimed, for instance by filtration, settling and/or centrifuging, if necessary. The finely ground iron ore or phosphate ore are then combined with water or a suitable aqueous liquid and mixed using mechanical mixing means to form a homogenous slurry called "pulp". The water used for preparation of the pulp may be tap water, surface water, ground water and/or recycled process water.

In the process according to the claimed embodiments of the invention conventional flotation plant equipment may be used. The process can be executed in any conventional mechanical flotation cells or column cells. While it is possible to conduct the process in mechanical flotation cells especially for ores having a high content of fine particles, as for example P80 of less than 50 μm, the use of column flotation cells has proven to be advantageous. The particle size can be determined by wet sieving according to ASTM E276-13 wherein sieves of different openings are used. P80 represents the diameter of openings through which eighty percent of the particles pass while D50 represents the diameter of the particle that 50 wt.-% of a sample's mass is smaller than and 50 wt.-% of a sample's mass is larger than.

The enrichment process can be accomplished in one or more subsequent flotation cells. The collector composition is added to the pulp, preferably in the flotation cell. For conditioning of the dispersed iron ore and phosphate ore, a suitable period of conditioning time of the pulp is required, for example at least one minute and sometimes as much as 10 or 15 minutes. Following the conditioning period air is injected at the bottom of the flotation cell and the air bubbles so formed rise to the surface, thereby generating a froth on the surface. The injection of air may be continued until no more froth is formed, which may be for at least one minute and as much as 15 or 20 minutes. The froth is collected and removed from the flotation cell. In a preferred embodiment the treatment of the residual slurry is repeated in a similar manner at least once. Often it is sufficient to repeat the treatment of the residual slurry once. In some instances it has been found to be advantageous to repeat the treatment more often as for example between three and ten times and especially between 4 and 6 times.

The collector composition according to the invention is preferably added to the pulp in an amount of 1 to 1,000 g/to, more preferably in amount of 10 to 500 g/to and especially preferred in an amount of 20 to 100 g/to of ore present in the pulp, as for example in an amount of 1 to 500 g/to, or in an amount of 1 to 100 g/to, or in an amount of 10 to 1,000 g/to, or in an amount of 10 to 100 g/to, or in an amount of 20 to 1,000 g/to, or in an amount of 20 to 500 g/to of ore present in the pulp.

The collector composition may be applied to the flotation pulp as such or as a solution respectively as an emulsion. Preferred solvent respectively dispersion medium is water, although mixtures of water with an alcohol may equally be used. Preferably the cationic flotation process is conducted in a pH range of between 7.0 and 12.0, such as between 7.5 and 11.0 and especially between 8.0 and 10.5.

This provides the minerals to exhibit the best suited surface charge. The best suited pH to some extent depends on the kind of mineral to be floated: while a pH of 8 has often been proven to be most efficient for the flotation of silicates in a magnetite ore, a pH of 10 has often proven to be advantageous for the flotation of silicates in a hematite ore. The pH is set, for example, by addition of sodium hydroxide.

In a preferred embodiment a depressing agent for the iron ore or phosphate ore is added to the pulp in order to avoid the mineral of interest being discharged with the froth. The depressant may be added directly to the pulp or as part of the collector composition. Suitable and preferred depressants include hydrophilic polysaccharides as for example cellulose ethers, such as methyl cellulose, hydroxyethyl cellulose, ethyl hydroxyethyl cellulose, carboxymethyl cellulose and sulphomethyl cellulose; hydrophilic gums, such as carrageenan, β-glucan, guar gum, xanthan gum, gum arabic, gum karaya, gum tragacanth and gum ghatti, alginates; and starch derivatives, such as carboxymethyl starch and phosphate starch. Especially preferred hydrophilic polysaccharides are gelatinized starches. As starches have only limited solubility in cold water their solubility must be improved, for example in a process known as gelatinization. Starch gelatinization can be realized by thermal gelatinization or alkali gelatinization. Preferred starches for the process according to the invention are maize starch and corn starch activated by treatment with alkali.

If present, the depressing agent is added to the pulp preferably in an amount of about 10 to about 2,500 g per ton of ore and more preferably in an amount of 100 to 1,000 g/to of ore, as for example between 10 and 1,000 g/to or between 100 and 2,500 g/to of ore. Preferably the pulp is conditioned in the presence of the depressant for at least one minute and up to for as much as 10 or 15 minutes as for example 5 minutes prior to the addition of the collector composition.

It is also within the scope of the invention to include further additives in the flotation system, such as pH regulating agents, modifiers, dispersants and/or co-collectors. They may serve to give improved dispersion, selectivity and/or flocculation. In a preferred embodiment the pulp contains at least one further additive selected from pH-regulators, modifiers, dispersants and/or co-collectors.

If desired, a froth-regulator can be added on a convenient occasion before the froth flotation. Examples of conventional froth regulators include methylisobutyl carbinol and alcohols having between six and 12 carbon atoms, such as ethylhexanol, and optionally alkoxylated with ethylene oxide and/or propylene oxide.

The collector composition, the process for enriching an iron ore or phosphate ore and the use of the composition according to the invention are especially advantageous for the enrichment of magnetite ($Fe_3O_4$), hematite ($Fe_2O_3$), goethite ($Fe_2O_3xH_2O$), or apatite ($Ca_5(PO_4)_3(F,Cl,OH)$. The invention is particularly suitable for the enrichment of hematite and magnetite. Furthermore, the invention is especially advantageous for processing of iron ores, for instance hematite containing high silica contents, for instance at least 20% by weight of iron ore, often at least 30%, and even at least 40% or more, for instance up to 60% or 70% or more. The process is especially suited for crude iron ores containing from 3% to 50 wt.-% silica and iron from 10 to 65 wt.-%, related to the weight of the ore.

In the context of this patent application the term "recovery rate" means the ratio of the iron or phosphate recovered in the concentrate obtained from the flotation process in relation to the initial total iron and phosphate mass in the crude ore.

In the context of this patent application, the terms "improvement of collector performance" and "improving the collector performance" mean (i) an increase of recovery rate when the hydroxyl ether diamine is present, compared to the case when it is absent, (ii) a higher selectivity in removal of silicates, which means that the collector composition comprising the hydroxyl ether diamine enables a higher proportion of the iron and phosphate to be retained and a higher proportion of the silicates to be removed, compared to the case when it is absent.

Example 1—Direct Flotation of Silicates from Iron Ore

TABLE 1

| Materials evaluated for direct flotation of silicates from iron ore | |
|---|---|
| A (comparative) | 3-(isodecyloxy)propylamine |
| B (comparative) | 1,3-Propanediamine, N-[3-(tridecyloxy)propyl]-, branched |
| C | 1-(2-aminoethylamino)-3-(octyloxy-/decyloxy)propan-2-ol |
| D | 1-(2-aminoethylamino)-3-(decyloxy)propan-2-ol |
| E | 1-(2-aminoethylamino)-3-(dodecyloxy-/tetradecyloxy)propan-2-ol |

TABLE 1-continued

| Materials evaluated for direct flotation of silicates from iron ore | |
|---|---|
| F | 1-(2-aminoethylamino)-3-(isononyloxy)propan-2-ol |
| G | 1-(2-aminoethylamino)-3-(octyloxy-)propan-2-ol |

The collectors A to G were tested in the direct flotation of silicates in an iron ore sample from flotation feed. The iron ore sample used for this study was characterized in terms of chemical analysis and particle size analysis with the results given in Table 3 (hereinafter also referred to as crude iron ore).

The content of silicate in the ores was determined by a gravimetric method. The ore was decomposed by an acid attack (HCl) leading to the dissolution of metal oxides and metal hydroxides, and leaving insoluble silicates as the residue. The iron content of the ores was determined by a titration method wherein the sample was decomposed by an acid attack (HCl), trivalent iron was reduced to bivalent iron by addition of stannous chloride ($SnCl_2$) and mercury chloride (HgCl) and the iron content was determined by titration with potassium dichromate ($K_2Cr_2O_7$).

The particle size was determined by wet sieving according to ASTM E276-13 wherein sieves of different openings were used. The results of this analysis are given in the table 2 below. P80 represents the diameter of openings through which eighty percent of the particles pass; D50 represents the diameter of the particle that 50 wt.-% of a sample's mass is smaller than and 50 wt.-% of a sample's mass is larger than; %-38 μm represents the percentage of particles smaller than 38 μm.

TABLE 2

Characterization of the crude iron ores used for flotation tests

| Item | Iron Ore Sample |
|---|---|
| iron content | 32.4% |
| silicate content | 51.4% |
| P80 | 124 μm |
| D50 | 63 μm |
| %−38 μm | 31.7% |

The flotation tests were done in laboratory scale using a Denver Flotation Cell D12 apparatus at a temperature of about 25 °C according to the following procedure: A sample with 1 kilogram of the respective crude iron ore was charged to the flotation cell of 1.5 I volume and water was added in order to prepare a pulp of 50 wt.-% of solids content. The stirrer was set to a speed of 1200 rpm and the pulp was homogenized for 1 minute. Then, a depressant (corn starch alkalized with NaOH in a weight ratio of starch to NaOH of 6:1) was added in a dosage rate of 600 mg/kg in respect to the dried ore. The pulp was conditioned under stirring for 5 minutes. The pH of the pulp was controlled and, if necessary, adjusted to 10.0 by further addition of NaOH. A collector composition according to Table 1 was added in the required dosage of dry ore. For ease of handling the collector compositions were applied as aqueous solutions of 1 wt.-% by weight active. The collector was conditioned in the ore pulp for 1 minute. Then air flow was started and froth flotation was done for 3 minutes. The floated mass (tailings) and the depressed mass (concentrated iron ore) were collected in separate bowls and dried in a lab oven. Both samples (depressed and floated) were then analyzed in respect to weight, $SiO_2$ content and iron content according to the methods described above.

The results are given in terms of the following parameters:

Fe content—Concentrate (wt.-%): content of Fe present in the concentrate (non floated mass).

$SiO_2$ content—Concentrate (wt.-%): content of silicate present in the concentrate (non floated mass).

Fe content—Tailings (wt.-%): content of Fe present in the tailings (floated mass).

$SiO_2$ content—Tailings (wt.-%): content of $SiO_2$ present in the tailings (floated mass).

Fe.Recovery (wt.-%): weight ratio of iron mass recovered in the concentrate (non floated mass) in relation to the total mass of iron in the crude iron ore.

Targets considered for this flotation trials are Fe content higher than 65 wt.-% in the concentrate and silicate lower than 3 wt.-% in the concentrate. A higher wt.-% of the Fe Recovery is better.

TABLE 3

Results of flotation experiments with iron ore sample

| Example | Collector | Dosage [g/to] | Fe content—Concentrate [wt.-%] | $SiO_2$ content—Concentrate [wt.-%] | Fe content—Tailings [wt.-%] | $SiO_2$ content—Tailings [wt.-%] | Fe Rec [wt.-%] |
|---|---|---|---|---|---|---|---|
| 1 | A (comparative) | 150 | 67.8% | 2.90% | 13.6% | 77.3% | 72.7% |
| 2 | B (comparative) | 150 | 66.5% | 4.82% | 12.8% | 78.8% | 76.5% |
| 3 | 50% A + 50% B (comparative) | 150 | 67.6% | 2.78% | 13.1% | 77.9% | 74.1% |
| 4 | C | 150 | 67.9% | 2.01% | 10.5% | 81.5 | 79.8% |
| 5 | D | 150 | 67.4% | 2.60% | 11.3% | 80.9 | 78.4% |
| 6 | E | 150 | 67.2% | 2.36% | 11.9% | 79.5% | 78.0% |
| 7 | F | 150 | 67.5% | 2.32% | 10.2% | 81.9% | 80.4% |
| 8 | G | 150 | 67.6% | 2.30% | 10.4% | 81.6% | 80.1% |

The experimental results show that the hydroxyl ether diamines (C to G) were able to collect silicates selectively from iron minerals, since $SiO_2$ content was reduced below 3% in the concentrate and the Fe recovery was higher than the benchmark collectors (Collector A and B). Results also demonstrated that the hydroxyl ether diamines achieved better results even than the benchmark collectors used in combination (test number 3), achieving less $SiO_2$ in the concentrate and higher iron recovery.

Example 2—Direct Flotation of Silicates from Phosphate Ore

TABLE 4

| Materials evaluated for direct flotation of silicates from phosphate ore | |
|---|---|
| A (comparative) | 3-(isodecyloxy)propylamine |
| B (comparative) | 1,3-Propanediamine, N-[3-(tridecyloxy)propyl]-, branched |
| F | 1-(2-aminoethylamino)-3-(isononyloxy)propan-2-ol |

Collectors A, B and F were tested in the direct flotation of silicates in a phosphate ore sample from flotation feed. The phosphate ore sample used for this study was characterized in terms of chemical analysis and particle size analysis with the results given in Table 5.

The content of $SiO_2$ and $P_2O_5$ in the ores was determined by X-ray fluorescence. The particle size was determined by wet sieving according to ASTM E276-13 wherein sieves of different openings were used. The results of this analysis are given in the table 7 below. P80 represents the diameter of openings through which eighty percent of the particles pass; D50 represents the diameter of the particle that 50 wt.-% of a sample's mass is smaller than and 50 wt.-% of a sample's mass 5 is larger than; %-38 μm represents the percentage of particles smaller than 38 μm.

TABLE 5

Characterization of the crude iron ores used for flotation tests

| Item | Phosphate Ore Sample |
|---|---|
| $P_2O_5$ content | 23.7% |
| $SiO_2$ content | 14.2% |
| P80 | 195 μm |
| D50 | 106 μm |
| %−38 μm | 1.4% |

The flotation tests were done in laboratory scale using a Denver Flotation Cell D12 apparatus at a temperature of about 25 °C according to the following procedure: A sample with 0.5 kilogram of the respective crude iron ore was charged to the flotation cell of 4.0 I volume and water was added in order to prepare a pulp of 15 wt.-% of solids content. The stirrer was set to a speed of 1300 rpm and the pulp was homogenized for 1 minute. The pH of the pulp was monitored, and flotation occurs under pulp natural pH (7.5). A collector composition according to Table 4 was added in the required dosage of dry ore. For ease of handling the collector compositions were applied as aqueous solutions of 1 wt.-% by weight active. The collector was conditioned in the ore pulp for 1 minute. Then air flow was started and froth flotation was done for 2.5 minutes during the rougher stage. The floated mass (tailings) was collected to a bowl. Remaining pulp was kept under stirring in the flotation cell to run the cleaner stage. Collector composition was added in the required dosage of dry ore. Then air flow was started and froth flotation was done for additional 2.5 minutes during the cleaner stage. Depressed mass (phosphate concentrate) was collected in separate bowls and dried in a lab oven. All samples (floated rougher, floated cleaner and depressed cleaner) were then analyzed in respect to weight, $SiO_2$ content and $P_2O_5$ content according to the methods described above.

The results are given in terms of the following parameters:

$P_2O_5$ content in concentrate (wt.-%): content of $P_2O_5$ present in the concentrated phosphate ore (depressed mass).

$SiO_2$ content in concentrate (wt.-%): content of $SiO_2$ present in the concentrated phosphate ore (depressed mass).

$SiO_2$ content in tailings (wt.-%): content of $SiO_2$ present in the tailings (floated mass).

$P_2O_5$ Recovery (wt.-%): weight ratio of $P_2O_5$ mass recovered in the concentrate (depressed mass) in relation to the total mass of $P_2O_5$ in the feed.

Targets considered for these flotation trials are $P_2O_5$ content higher than 29 wt.-% % in the concentrate and $SiO_2$ lower than 5 wt.-% in the concentrate. A higher wt.-% of the $P_2O_5$ Recovery is better.

TABLE 6

Results of flotation experiments with phosphate ore sample

| Example | Collector | Dosage [g/to] | $P_2O_5$ Content in concentrate [wt.-%] | $SiO_2$ Content in concentrate [wt.-%] | $SiO_2$ Content in tailings [wt.-%] | $P_2O_5$ Recovery [wt.-%] |
|---|---|---|---|---|---|---|
| 1 | A | 150 | 30.3% | 3.52% | 30.7% | 74.2% |
| 2 | B | 150 | 30.1% | 3.78% | 33.7% | 77.9% |
| 3 | F | 150 | 30.7% | 3.47% | 43.6% | 89.0% |

The experimental results show that the hydroxyl ether diamine (F) was able to collect silicates selectively from phosphate minerals, since $SiO_2$ content was reduced below 5 wt.-% in the concentrate. Surprisingly it was demonstrated that the hydroxyl ether diamine achieved even higher $P_2O_5$ recovery than the benchmark collectors (collector A and B).

For both Fe Recovery and $P_2O_5$ Recovery, direct flotation of silicates in an iron ore and direct flotation of silicates in a phosphate ore, collectors based on hydroxyl ether diamine have demonstrated higher selectivity in the process, ensuring quality targets and recovering higher amount of the valuable minerals, by higher iron and phosphate recoveries. It follows that the flotation process is more sustainable, since less waste is generated and greater use of mineral resources is guaranteed, compared to benchmark technology.

The invention claimed is:

1. A process for separating silicates from a crude iron oxide ore via froth flotation, the process comprising foaming a mixture of an aqueous pulp of the crude iron oxide ore, a collector composition, and one or more depressants to provide a foamed mixture, where the collector composition comprises (a) at least one hydroxyl ether diamine according to Formula (1), Formula (1)

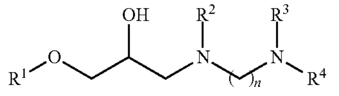

wherein $R^1$ is a linear or branched alkyl or alkenyl group having $C_8$ or $C_9$ carbon atoms;

$R^2$, $R^3$, $R^4$ are, independently, H or a linear or branched alkyl or alkenyl group having $C_1$-$C_5$ carbon atoms; and n is an integer 2-5, (b) at least one salt of the at least one hydroxyl ether diamine according to Formula (1) formed by neutralization with formic, acetic, propionic or hydrochloric acid; or (c) a mixture of (a) and (b), separating and removing a silicate-enriched froth from the foamed mixture, and recovering an iron oxide-enriched concentrate as a bottom fraction of the foamed mixture, wherein the crude iron oxide ore contains at least 3 wt % of silicates, based on the total weight of the crude iron oxide ore, the process is performed at a pH of between 7.0 and 12.0, and the silicates are selectively floated in the silicate-enriched froth.

2. The process according to claim 1, wherein $R^1$ is a linear or branched alkyl or alkenyl group having $C_9$ carbon atoms.

3. The process according to claim 1, wherein $R^1$ is a branched alkyl group.

4. The process according to claim 1, wherein $R^1$ is an isononyl group.

5. The process according to claim 1, wherein the crude iron oxide ore is selected from magnetite, hematite, and goethite.

6. The process according to claim 1, wherein greater than 65 wt.-% of the total weight of the iron oxide-enriched concentrate is iron, and less than 3 wt.-% of the total weight of the iron oxide-enriched concentrate is $SiO_2$.

7. The process according to claim 1, wherein the collector composition comprises at least one selected from 1-(2-aminoethylamino)-3-(octyloxy)propan-2-ol, 1-(2-aminoethylamino)-3-(isononyloxy)propan-2-ol, a salt of 1-(2-aminoethylamino)-3-(octyloxy)propan-2-ol, and a salt of 1-(2-aminoethylamino)-3-(isononyloxy)propan-2-ol.

8. The process according to claim 7, wherein the collector composition comprises 1-(2-aminoethylamino)-3-(isononyloxy)propan-2-ol.

9. The process according to claim 1, wherein the collector composition comprises at least two selected from 1-(2-aminoethylamino)-3-(octyloxy)propan-2-ol, 1-(2-aminoethylamino)-3-(isononyloxy)propan-2-ol, a salt of 1-(2-aminoethylamino)-3-(octyloxy)propan-2-ol, and a salt of 1-(2-aminoethylamino)-3-(isononyloxy)propan-2-ol.

10. The process according to claim 9, wherein the collector composition comprises 1-(2-aminoethylamino)-3-(octyloxy)propan-2-ol and 1-(2-aminoethylamino)-3-(isononyloxy)propan-2-ol.

11. The process according to claim 1, wherein $R^2$, $R^3$, and $R^4$ are H.

12. The process according to claim 1, wherein the crude iron ore contains at least 20 wt.-% of silicates, based on the total weight of the crude iron oxide ore.

13. A process for separating silicates from a crude phosphate ore via froth flotation, the process comprising foaming a mixture of an aqueous pulp of the crude phosphate ore and a collector composition to provide a foamed mixture, where the collector composition comprises (a) at least one hydroxyl ether diamine according to Formula (1), Formula (1)

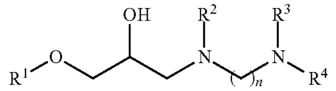

wherein $R^1$ is a linear or branched alkyl or alkenyl group having $C_8$-$C_9$ carbon atoms;

$R^2$, $R^3$, $R^4$ are, independently, H or a linear or branched alkyl or alkenyl group having $C_1$-$C_5$ carbon atoms; and n is an integer 2-5;

(b) at least one salt of the at least one hydroxyl ether diamine according to Formula (1) formed by neutralization with formic, acetic, propionic or hydrochloric acid; or (c) a mixture of (a) and (b), separating and removing a silicate-enriched froth from the foamed mixture, and recovering a phosphate-enriched concentrate as a bottom fraction of the foamed mixture, wherein the process is performed at a pH of between 7.0 and 12.0, and the silicates are selectively floated in the silicate-enriched froth.

14. The process according to claim 13, wherein the crude phosphate ore is apatite.

15. The process according to claim 13, wherein $R^1$ is a linear or branched alkyl or alkenyl group having $C_9$ carbon atoms.

16. The process according to claim 13, wherein $R^1$ is an isononyl group.

17. The process according to claim 13, wherein the collector composition comprises at least one selected from 1-(2-aminoethylamino)-3-(octyloxy)propan-2-ol, 1-(2-aminoethylamino)-3-(isononyloxy)propan-2-ol, a salt of 1-(2-aminoethylamino)-3-(octyloxy)propan-2-ol, and a salt of 1-(2-aminoethylamino)-3-(isononyloxy)propan-2-ol.

18. A process for separating silicates from a crude iron oxide ore or crude phosphate ore via froth flotation, the process comprising foaming a mixture of an aqueous pulp of the crude iron oxide ore or crude phosphate ore, a collector composition, and one or more depressants to provide a foamed mixture, where the collector composition comprises at least one hydroxyl ether diamine according to Formula (1), Formula (1)

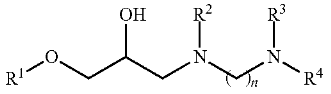

and/or one or more salts thereof, wherein $R^1$ is a linear or branched alkyl or alkenyl group having $C_8$ or $C_9$ carbon atoms;

$R^2$, $R^3$, $R^4$ are, independently, H or a linear or branched alkyl or alkenyl group having $C_1$-$C_5$ carbon atoms; and n is an integer 2-5, separating and removing a silicate-enriched froth from the foamed mixture, and recovering an iron oxide-enriched concentrate or phosphate-enriched concentrate as a bottom fraction of the foamed mixture, wherein the process is performed at a pH of between 7.0 and 12.0, and the silicates are selectively floated in the silicate-enriched froth.

19. The process according to claim 18, wherein $R^1$ is a linear or branched alkyl or alkenyl group having Ca carbon atoms.

20. The process according to claim 2, wherein the collector composition comprises at least one selected from 1-(2-aminoethylamino)-3-(octyloxy)propan-2-ol, 1-(2-aminoethylamino)-3-(isononyloxy)propan-2-ol, a salt of 1-(2-aminoethylamino)-3-(octyloxy)propan-2-ol, and a salt of 1-(2-aminoethylamino)-3-(isononyloxy)propan-2-ol.

* * * * *